(12) United States Patent
Cock et al.

(10) Patent No.: US 7,990,316 B2
(45) Date of Patent: Aug. 2, 2011

(54) ANTENNA SYSTEM HAVING FEED SUBARRAY OFFSET BEAM SCANNING

(75) Inventors: Robert T. Cock, Vail, AZ (US); Ralph T. Tadaki, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 300 days.

(21) Appl. No.: 12/099,305

(22) Filed: Apr. 8, 2008

(65) Prior Publication Data
US 2009/0251369 A1 Oct. 8, 2009

(51) Int. Cl.
*H01Q 3/00* (2006.01)
*H01Q 19/06* (2006.01)
*H01Q 19/10* (2006.01)
*G01S 5/02* (2010.01)

(52) U.S. Cl. ........ 342/372; 342/373; 342/374; 342/427; 343/754; 343/755

(58) Field of Classification Search .......... 342/371–374, 342/377, 427, 80, 149–154; 343/761, 754–755
See application file for complete search history.

(56) References Cited

U.S. PATENT DOCUMENTS

| 3,878,523 | A | | 4/1975 | Wild |
| 3,993,999 | A | | 11/1976 | Hemmi et al. |
| 4,160,975 | A | * | 7/1979 | Steudel ........................ 342/149 |
| 6,456,238 | B1 | | 9/2002 | Posey |
| 6,667,720 | B1 | * | 12/2003 | Anderton ..................... 343/761 |
| 2007/0001897 | A1 | * | 1/2007 | Alland ............................ 342/81 |

FOREIGN PATENT DOCUMENTS
EP 1 348 978 10/2003

OTHER PUBLICATIONS

P. Hannan et al., A monopulse antenna having independent optimization of the sum and difference Modes, IRE International Convention Record, vol. 9, p. 57-60, Mar. 1961.*
International Search Report and Written Opinion for corresponding application No. PCT/US2009/032525 dated Apr. 3, 2009.

* cited by examiner

*Primary Examiner* — Thomas H Tarcza
*Assistant Examiner* — Fred H Mull
(74) *Attorney, Agent, or Firm* — Renner, Otto, Boiselle & Sklar, LLP

(57) ABSTRACT

An antenna system and electronic scanning method that employs feed subarray electronic offset beam scanning. The system includes a feed element containing an array of electronic transmitting/receiving elements. The system further includes a reflector for reflecting signals received from the feed element to a target region, and for reflecting signals received from a target region to the feed element. Electronic beam scanning is achieved by activating and deactivating in turn subarrays within the array of transmitting/receiving elements of the feed element.

19 Claims, 6 Drawing Sheets

ANTENNA SYSTEM HAVING FEED SUBARRAY OFFSET BEAM SCANNING

TECHNICAL FIELD OF THE INVENTION

The technology of the present disclosure relates generally to electronic scanning antenna systems, and more particularly to an antenna system having feed subarray electronic offset beam scanning.

DESCRIPTION OF THE RELATED ART

Radar and comparable electronic tracking systems use antennas for locating and tracking aircraft, vehicles, and/or various other moving objects. Antennas operate directionally, so one issue associated with such locating and tracking systems is scanning wide regions of space with the antenna.

One solution is to "gimbal" the antenna with a mechanical mechanism that physically rotates the antenna in the azimuth and/or elevation directions to scan. Gimbaled antennas are common, but the mechanical components often are expensive and have a larger size and more weight than is desirable for smaller systems. The various mechanical components also may require substantial maintenance.

As an alternative to gimbaled antennas, electronically scanned array (ESA) antennas have been developed. ESA antennas incorporate arrays of signal transmitting/receiving elements. When transmitting, the signals of the elements are phase shifted relative to one another so that the signals combine in a manner resulting in a signal beam being transmitted substantially in a particular target direction. Similarly, when the elements are phase shifted in this manner, the antenna may receive signals from the particular target direction. By continuously adjusting the phase shifting, the signal direction adjusts in turn resulting in a scanning effect.

As part of an ESA system, antennas may operate in monopulse mode. As is known in the art, tracking may be achieved using "Sum" and "Delta" or difference channels. Scanning is accomplished first by transmitting a Sum signal, which in a broad sense can determine whether an object is within the view of the tracking system. In the receiving mode, in addition to receiving a Sum signal, Delta or difference signals may be received to fine tune an object's position. The Delta signal may include Delta-azimuth (Delta-AZ) and Delta-elevation (Delta-EL) components to improve tracking in the respective azimuth and elevation directions. In a conventional monopulse configuration, in the receiving mode the Sum and Delta signals (AZ and EL) all are combined within a single pulse, and a circuitry network separates the received signal into the individual components.

ESA systems are currently used on many large platforms such as aircraft, ships, and fixed base structures, and are desired for guidance systems in rockets and guided munitions, such as guided missiles and the like. For smaller, lower cost missile and munitions systems, however, conventional ESAs have proven too costly, large, heavy, and power intensive (much like the comparable gimbaled systems). The RF electronics of the feed element tends to be too large, and the monopulse network or circuitry may add significant cost, weight, and volume.

SUMMARY

Accordingly, there is a need in the art for an electronic scanning antenna system that has reduced size, weight, cost, and power consumption, with comparable effectiveness to that of conventional ESA or gimbaled systems. The following describes an antenna system and electronic scanning method that employs feed subarray electronic offset beam scanning. The system includes a feed element containing an array of electronic transmitting/receiving elements. The system further includes a reflector for reflecting signals received from the feed element to a target region, and for reflecting signals received from a target region to the feed element. Electronic beam scanning is achieved by activating and deactivating in turn subarrays within the array of transmitting/receiving elements of the feed element. By activating and deactivating subarrays in turn, beam area scanning may be achieved with as little as ten percent of the transmitting/receiving elements as in a comparably effective conventional ESA, and without the mechanical components required in gimbaled systems. In addition, Sum and Delta pulses are received serially in a multi-pulse configuration, thereby obviating the need for additional signal processing circuitry as needed in conventional monopulse systems.

Therefore, according to one aspect of the invention, an antenna system comprises a feed element containing an array of transmitting/receiving elements, and a reflector for reflecting signals received from the feed element to a target region, and for reflecting signals received from a target region to the feed element. The antenna system further comprises a beam scanner which activates and deactivates in turn subarrays within the array of transmitting/receiving elements of the feed element to steer a scanned beam.

According to one embodiment of the antenna system, the beam scanner activates each subarray in a transmitting mode to form a Sum channel for transmitting a Sum pulse.

According to one embodiment of the antenna system, the beam scanner further activates each subarray in a receiving mode to form a Sum channel for receiving a Sum pulse.

According to one embodiment of the antenna system, the beam scanner further activates each subarray in a receiving mode to form a Delta channel for receiving a Delta pulse.

According to one embodiment of the antenna system, the beam scanner forms the Delta channel as a Delta-AZ channel or a Delta-EL channel.

According to one embodiment of the antenna system, the Delta channel is centered within the activated subarray.

According to one embodiment of the antenna system, the Sum channel is a 4×4 subarray of transmitting/receiving elements.

According to one embodiment of the antenna system, the center four transmitting/receiving elements of the Sum channel are phase shifted 180 degrees relative to the other transmitting/receiving elements of the Sum channel.

According to one embodiment of the antenna system, the beam scanner further activates each subarray in a receiving mode to form a Delta channel for receiving a Delta pulse, and the Delta channel includes the center four elements of the Sum channel.

According to one embodiment of the antenna system, beam scanner phase shifts at least one transmitting/receiving element to correct for an offset phase error.

According to one embodiment of the antenna system, a plurality of activated subarrays is offset from a center point of the reflector.

Another aspect of the invention is a method of scanning a beam scan area of an antenna system including a reflector and a feed element having an array of transmitting/receiving elements. The method comprises the steps of activating a first subarray of transmitting/receiving elements within the array of the feed element, transmitting a signal from the first activated subarray to a target region, and entering a receiving mode, wherein the first activated subarray is configured to receive a signal from the target region. The method further comprises deactivating the first activated subarray, and activating a second subarray, wherein the second activated subarray has at least one transmitting/receiving element that is not contained within the first activated subarray.

According to one embodiment of the method of scanning, the method further comprises repeating each step until each transmitting/receiving element in the feed element array has been activated and deactivated to steer a scanned beam.

Another aspect of the invention is a method of tracking an object within a beam scan area of an antenna system including a reflector and a feed element having an array of transmitting/receiving elements. The method comprises the steps of activating a first subarray of transmitting/receiving elements within the array of the feed element, transmitting a Sum pulse from the first activated subarray to a target region, and receiving a pulse from the target region. The method further comprises deactivating the first activated subarray, and activating a second subarray, wherein the second activated subarray has at least one transmitting/receiving element that is not contained within the first activated subarray.

According to one embodiment of the method of tracking an object, the method further comprises repeating each step until each transmitting/receiving element in the feed element array has been activated and deactivated to steer a scanned beam.

According to one embodiment of the method of tracking an object, the transmitting and receiving steps further comprise transmitting a first Sum pulse from the first activated subarray to a target region, receiving a Sum pulse from the target region, transmitting a second Sum pulse from the first activated subarray to a target region, and receiving a Delta pulse from the target region.

According to one embodiment of the method of tracking an object, the method further comprises repeating each step until each transmitting/receiving element in the feed element array has been activated and deactivated to steer a scanned beam.

According to one embodiment of the method of tracking an object, the transmitting and receiving steps further comprise transmitting a first Sum pulse from the first activated subarray to a target region, receiving a Sum pulse from the target region, transmitting a second Sum pulse from the first activated subarray to the target region, receiving a Delta-AZ pulse from the target region, transmitting a third Sum pulse from the first activated subarray to the target region, and receiving a Delta-EL pulse from the target region.

According to one embodiment of the method of tracking an object, the Delta-AZ and Delta-EL pulses are received by transmitting/receiving elements centrally located within the activated subarray.

According to one embodiment of the method of tracking an object, the method further comprises repeating each step until each transmitting/receiving element in the feed element array has been activated and deactivated to steer a scanned beam.

According to one embodiment of the method of tracking an object, the method further comprises correcting for an offset phase error by phase shifting at least one transmitting/receiving element within an activated subarray.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
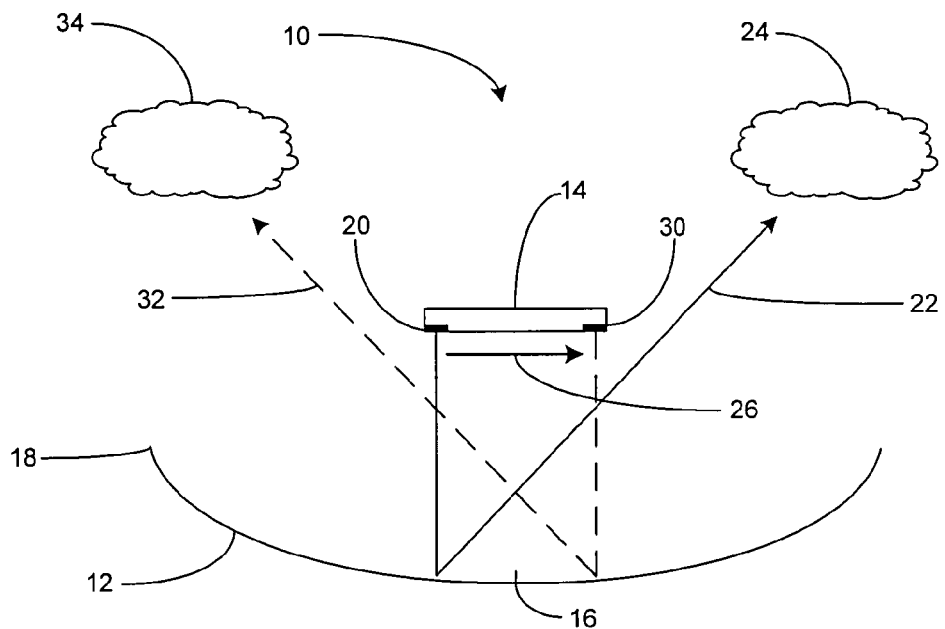
FIG. 1 is a schematic side view of an antenna system in accordance with an embodiment of the present invention.

Embodiments of the present invention will now be described with reference to the drawings, wherein like reference numerals are used to refer to like elements throughout. It will be understood that the figures are not necessarily to scale.

FIG. 1 is a schematic side view of an antenna system 10 in accordance with an embodiment of the present invention. The antenna system may include a reflector 12 in the form of a parabolic dish, as is known in art. Antenna system 10 also may include a feed element 14 containing an array of electronic signal transmitting/receiving elements, as will be further described below. The feed element 14 may be centered about a midpoint 16 of the reflector. It will be appreciated that the feed element 14 may be attached to or held in place relative to the reflector by structural elements, which, for simplicity, are not shown the FIG. 1. Although the precise configuration may vary, in one exemplary embodiment a line from the center of the feed element to the midpoint of the reflector forms approximately a sixty-three degree angle with a line from the center of the feed element to an edge point 18 of the reflector. In one embodiment, the dish may have a diameter of approximately 5.75 inches with the feed element positioned approximately 2.375 inches from the midpoint 16 of the dish. Such a configuration provides for efficient transmission and receiving of signals with the antenna system 10, although any number of other configurations and sizes may be employed without departing from the scope of the invention.

In contrast to conventional ESA systems in which all transmitting/receiving elements of the ESA are activated, in exemplary embodiments of the present invention the entire array of transmitting/receiving elements is not activated at one time. Instead, distinct subarray portions of the feed element 14 are activated and deactivated in turn. For example, FIG. 1 depicts a first activated subarray 20 in a transmitting mode, with the signal beam indicated by the solid arrow pathway 22. Because the first subarray is off center relative to the midpoint 16 of the reflector 12, a signal originating from the first subarray is reflected toward a target region 24. It will be appreciated that in a receiving mode, the signal would travel in the reverse direction from the target region 24 to be reflected by the reflector back to the first subarray 20.

Electronic scanning is accomplished by activating and deactivating various subarrays in turn. For example, in FIG. 1 arrow 26 indicates an exemplary direction of activation and deactivation from the first subarray 20 to a second subarray 30. The first subarray 20 represents one extreme position of an activated subarray, and the second subarray 30 represents an opposite extreme position of a last subarray to be activated. As will be further described below, intermediate subarrays are activated between the activation of the first subarray 20 and the second subarray 30 such that each portion of the entire feed element 14 is activated in turn. With respect to subarray 30, the dashed arrowed pathway 32 illustrates the signal transmission when the second subarray 30 is activated. Because the second subarray is also off center (except in an opposite direction relative to first subarray 20), a signal from the second subarray is reflected by the reflector toward a second target region 34. It will be appreciated that in a receiving mode, the signal would travel in the reverse direction from the target region 34 to be reflected by the reflector back to the second subarray 30.

Figure 2:
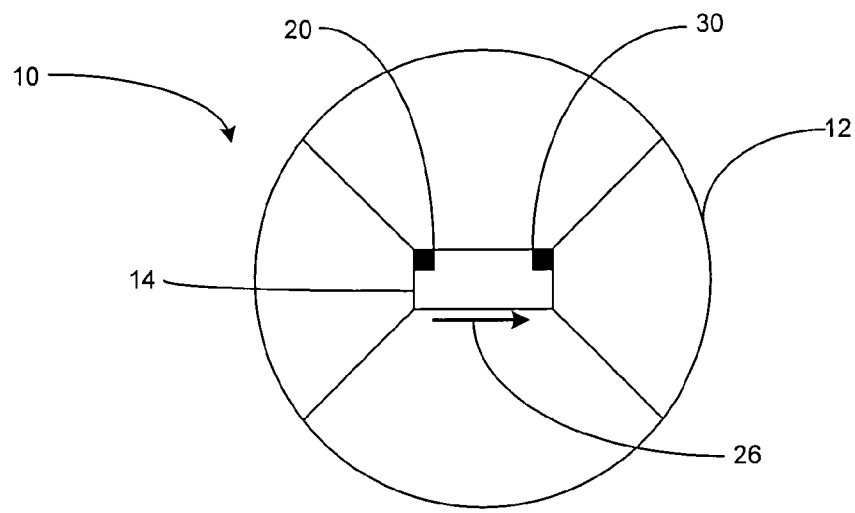
FIG. 2 is a schematic top view of the antenna system of FIG. 1.
Figure 3:
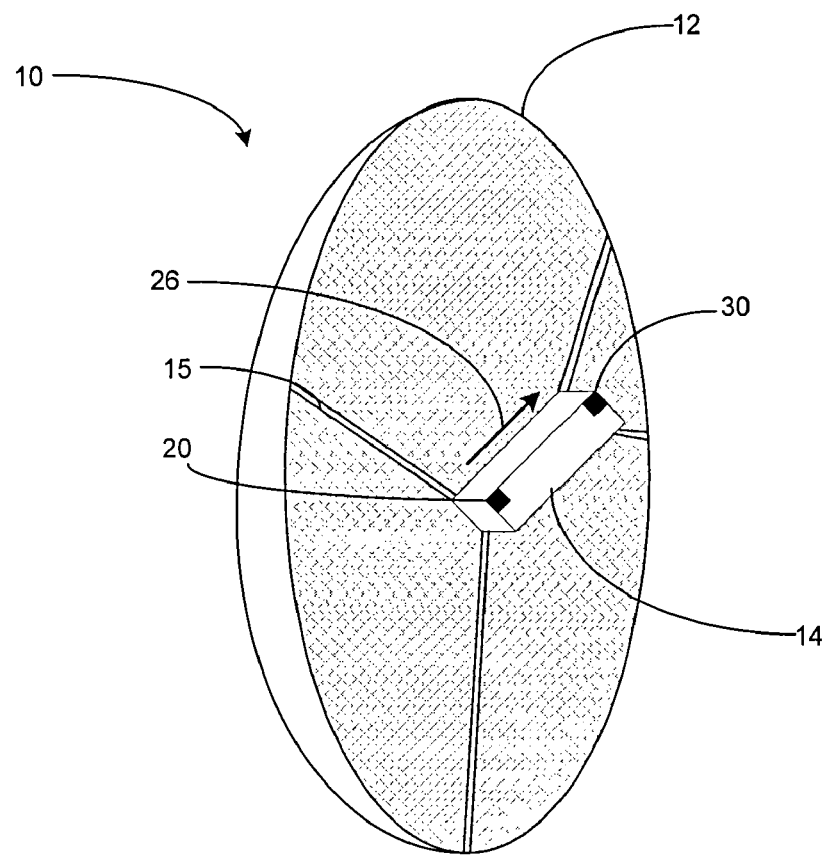
FIG. 3 is a schematic three-dimensional view of an antenna system for use in accordance with an embodiment of the present invention.

FIG. 2 is a schematic top view of the antenna system 10. Again, scanning is represented by arrow 26 indicating the separate activation and deactivation of subarrays from subarray 20, through intermediate subarrays, to subarray 30. FIG. 3 is a schematic three-dimensional view of the antenna system 10 showing the feed element 14 mounted to the dish 12 with supports 15. FIG. 3 similarly depicts the separate activation and deactivation of subarrays from subarray 20 in turn, through intermediate subarrays, to subarray 30.

Referring again to FIG. 1, the activation of subarrays 20 and 30 represent signal communication with target regions at opposite ends of the beam scan area of the antenna system. Intermediate subarrays may be activated between subarrays 20 and 30 to achieve signal communication with target regions between target regions 24 and 34. As represented with arrow 26, the intermediate subarrays may be activated in turn resulting in a scanning effect to steer a scanned beam across the accessible beam scan area of the antenna system. See also arrow 26 depicted in FIGS. 2 and 3.

Figure 4:
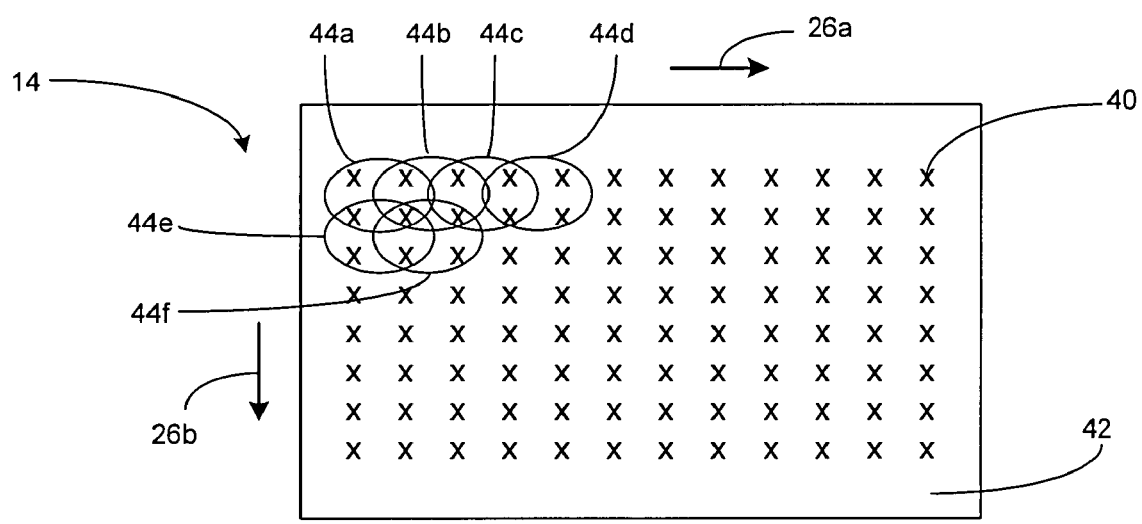
FIGS. 4, 5A, and 5B are schematic diagrams of an exemplary feed element for use in accordance with an embodiment of the present invention.
Figure 5A:
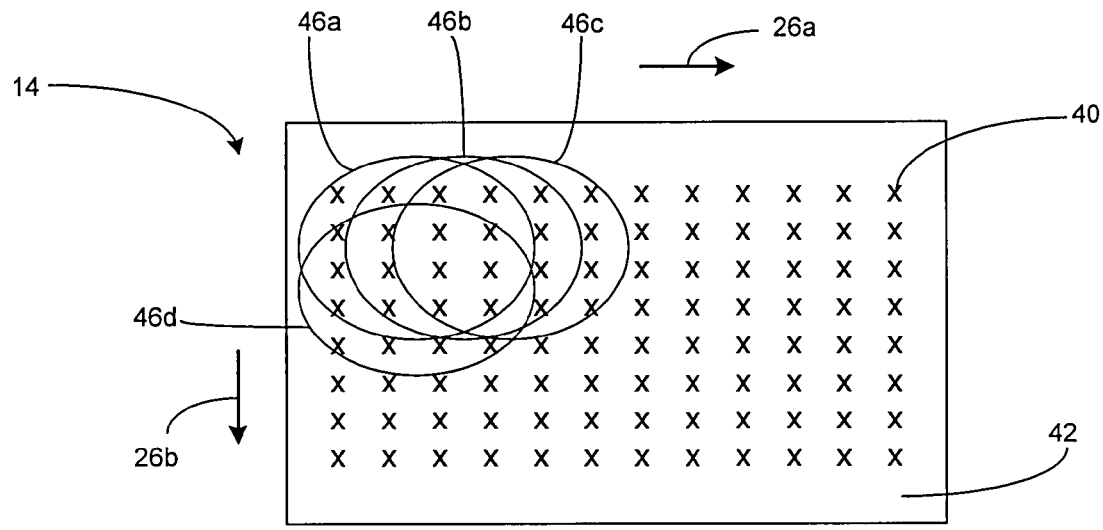

The scanning using subarrays is further illustrated in FIGS. 4 and 5A. FIG. 4 is a schematic diagram of an exemplary ESA feed element 14. The feed element 14 has a plurality of transmitting/receiving elements 40 embedded within a substrate 42, as is conventional. In this exemplary embodiment, the elements are configured in an 8×12 array of ninety-six elements. The feed element, for example, may be a two-inch modular ESA with the elements spaced approximately 0.17 inches apart (half wave), although other array sizes and configurations may be employed. FIG. 4 depicts the scanning effect described above, by which subarrays are activated and deactivated in turn to steer a scanned beam across the entire beam scan area of the antenna system. In this figure, four subarrays 44a, 44b, 44c, and 44d are shown as represented with the oval indicators. In this embodiment, each subarray is a 2×2 element matrix, and the scanning effect in the azimuth direction, indicated by arrow 26a, may be achieved by shifting the activated region over one or more columns of elements at a time in turn. Subarrays 44e and 44f demonstrate that the activation and deactivation of 2×2 subarrays also may proceed in turn by shifting the activated region down one or more rows of elements at a time, as indicated by arrow 26b, to provide scanning in the elevation direction. It will be appreciated that full beam area scanning may be achieved by activating and deactivating subarrays in turn over the entire feed element.

FIG. 5A depicts another exemplary embodiment in which each subarray is a 4×4 element matrix. FIG. 5A similarly depicts the scanning effect described above, by which subarrays are activated and deactivated in turn to steer a scanned beam across the entire beam width of the antenna system. In this figure, three subarrays 46a, 46b, and 46c are shown as represented with the oval indicators. The scanning effect again may be achieved in the azimuth direction (arrow 26a) by shifting the activated region over one or more columns of elements at a time in turn. Subarray 44d demonstrates that the activation of 4×4 subarrays also may proceed in the elevation direction (arrow 26b) by shifting in turn the activated region down one or more rows of elements, until the entire beam scan area is scanned.

Figure 5B:
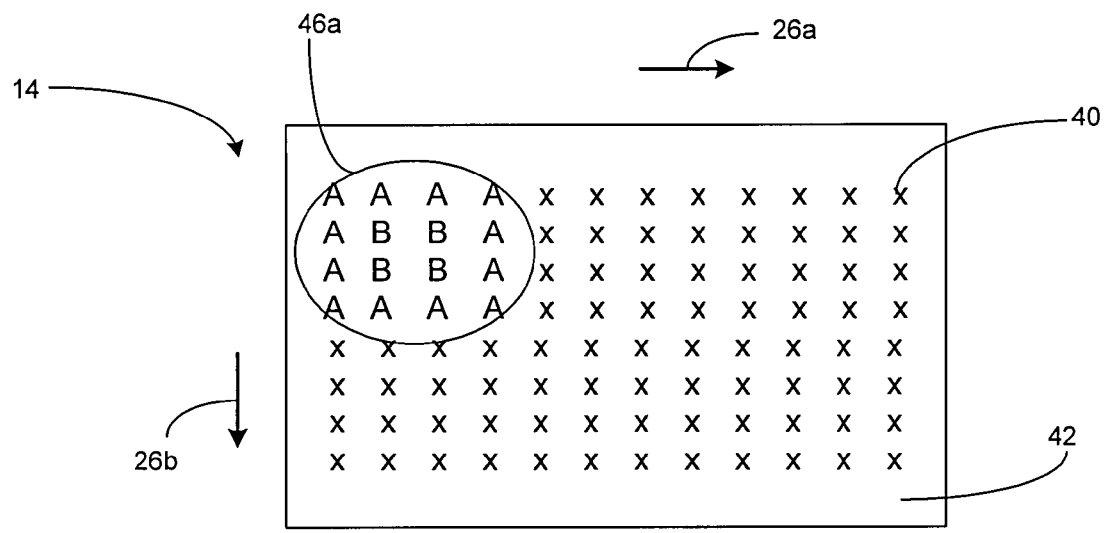

FIG. 5B depicts an exemplary embodiment in which one activated 4×4 subarray 46a is depicted. In this embodiment, the center four elements are phase shifted 180 degrees relative to the phase of the outer eight elements. The phase shifting is represented by the identifiers "A" and "B" in the activated subarray. Central reflection from the reflector is blocked by the feed element itself, and the phase shifting creates a hole in the center of the feed pattern so that the reflector is illuminated in the areas that are not blocked, yielding improved antenna efficiency. This phase-shifting pattern sometimes is referred to as a "spoiled" subarray.

Figure 6:
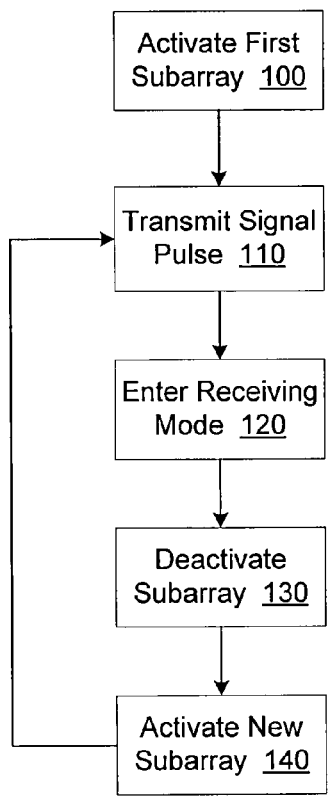
FIG. 6 is a flowchart depicting an exemplary method of scanning a beam scan area of an antenna system in accordance with an embodiment of the present invention.

FIG. 6 is a flowchart depicting an exemplary method of scanning a beam scan area of an antenna system in accordance with an embodiment of the present invention. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100 by activating a first subarray of transmitting/receiving elements within the broader array of the feed element. The first subarray may be activated in a transmitting mode, and at step 110 the activated subarray may transmit a pulse to a target region. At step 120, the activated subarray, under control of an offset beam scanner described below, may enter a receiving mode. When in the receiving mode, the activated subarray may receive a return signal bounced off an object, if any, within the target region. The activated subarray may be deactivated at step 130, and at step 140 a new subarray may be activated. As described above, the new subarray has at least one transmitting/receiving element not contained in the previously activated subarray. In this manner, the new subarray may transmit and receive signals associated with a target region different from that of the previously activated subarray. As shown by the arrow, the method may repeat such that varying subarrays are activated and deactivated in turn to produce the electronic scanning effect.

By electronically scanning by activating and deactivating subarrays in turn, various improvements over other scanning methods are realized. Because the scanning is electronic, gimbal systems or other mechanical orientation systems are not required. The disclosed antenna system, therefore, is smaller, lighter weight, and less costly than conventional mechanical systems, and requires less maintenance. In addition, in traditional ESA systems, the entire array is activated, and scanning is achieved by manipulating the respective phases of the various elements. To achieve the same beam scan area as in a gimbaled system, the ESA generally must be of a size comparable to that of the entire dish. In the system disclosed herein, in contrast, the feed element may be substantially smaller than the dish, and thus smaller than a conventional ESA, to scan the same beam scan area. Applicant has found that the feed element of the disclosed system may be constructed having as little as about ten percent of the elements of a conventional ESA to achieve a comparable beam scan area. The disclosed system, therefore, also is smaller, lighter weight, and less costly than conventional ESA systems. As such, the disclosed system is more readily mounted on and incorporated into electronic guidance systems of relatively small objects, such as small guided munitions.

Figure 7:
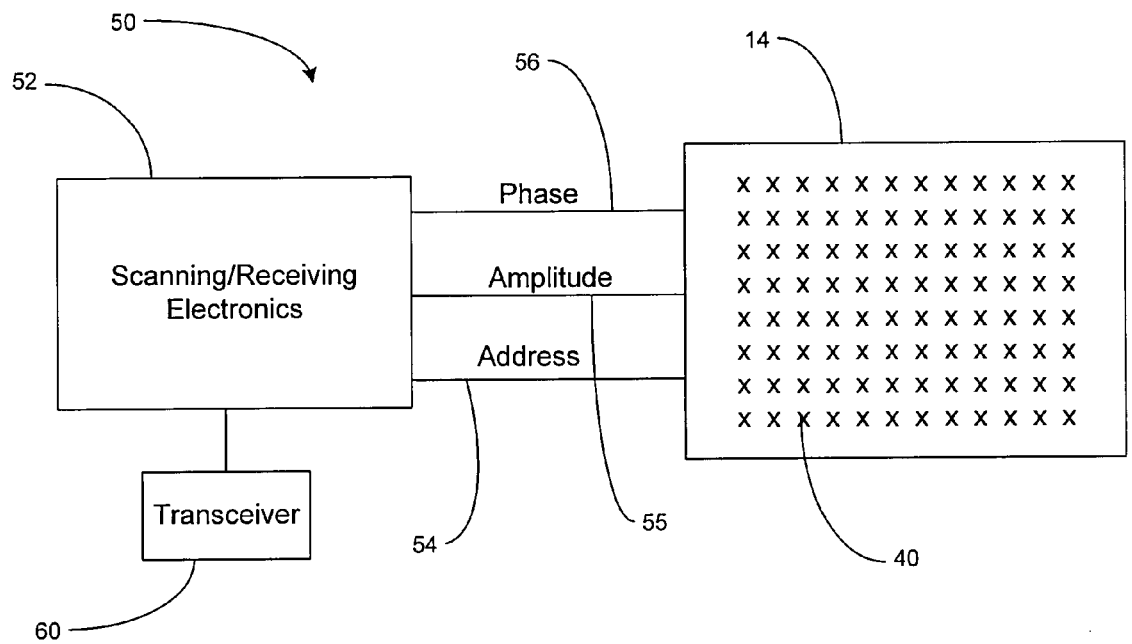
FIG. 7 is a schematic block diagram of an exemplary controller for a feed element for use in accordance with an embodiment of the present invention.

FIG. 7 is a schematic block diagram depicting an electronic offset scanner 50 for controlling the feed element 14. The offset scanner 50 may be configured using a conventional ESA controller modified with appropriate software and phase calculation programming. The programming of ESA controllers is known in the art, and therefore the details of such programming are not included herein. As with any conventional ESA, each transmitting/receiving element 40 may be separately controlled by scanning/receiving electronics 52 interfaced to a transceiver 60. The electronics 52 may provide an address input 54, an amplitude input 55, and a phase input 56 to each element 40 so as to control the particular subarray of elements activated at any given time. The address input activates or deactivates (turns on or off) each element in turn as needed to provide the offset beam scanning effect described above. As stated above, a plurality of elements may be addressed together in subarrays, such as, for example, subarrays containing 2×2, 4×4, or some other matrix of elements within the broader feed element 14. The amplitude input sets the amplitude of each element. In an exemplary embodiment, the amplitude input is the same for each element in a given activated subarray.

Phase input 56 may be employed to individually adjust the phase of each element. For example, one use of the individualized phase adjustment is to produce the spoiled subarray depicted in FIG. 5B. Another use of phase adjustment is offset error correction. In particular, each activated subarray (except for a center subarray) is offset from the midpoint 16 of the dish 12 (see, e.g., FIG. 1), and the precise magnitude of the offset differs for each element of each offset subarray. The result of these varying offsets is the introduction of a slight phase error when the phase of a given activated subarray is measured relative to the phase of the elements in a subsequently activated subarray. Phase input 56 may be employed to provide offset phase error correction by adjusting the phase of the various elements as needed to correct for any offset phase error introduced during scanning.

Phase input 56 also may be employed to incorporate "Sum" and "Delta" (difference) channels into a given subarray. As is known in the art, the Sum signal or channel is achieved by summing all of the signals associated (transmitted or received) with the activated elements. The Sum channel may be used to determine if an object is within a given target region. The Delta channel generates a difference signal that may be employed with the Sum channel to track or "fine tune" the precise location of an object within the target region. As stated above, the Delta channel may include Delta-AZ and Delta-EL components. The use of Sum and Delta channels generally is known in art, but such channels are configured in a new manner in the present invention.

Figure 8A:
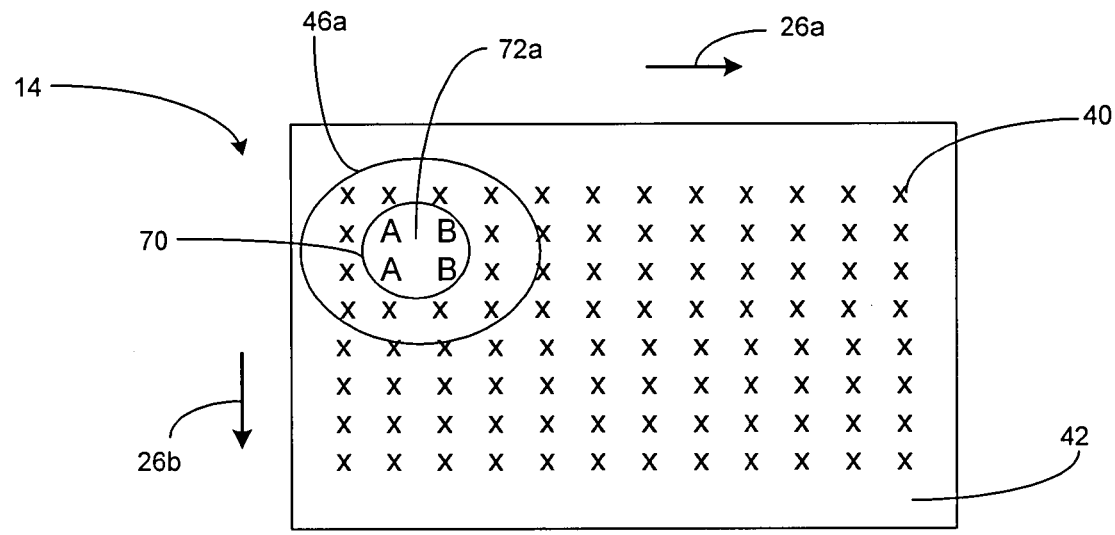
FIGS. 8A and 8B are schematic diagrams of exemplary Delta channels within a feed element for use in accordance with an embodiment of the present invention.
Figure 8B:
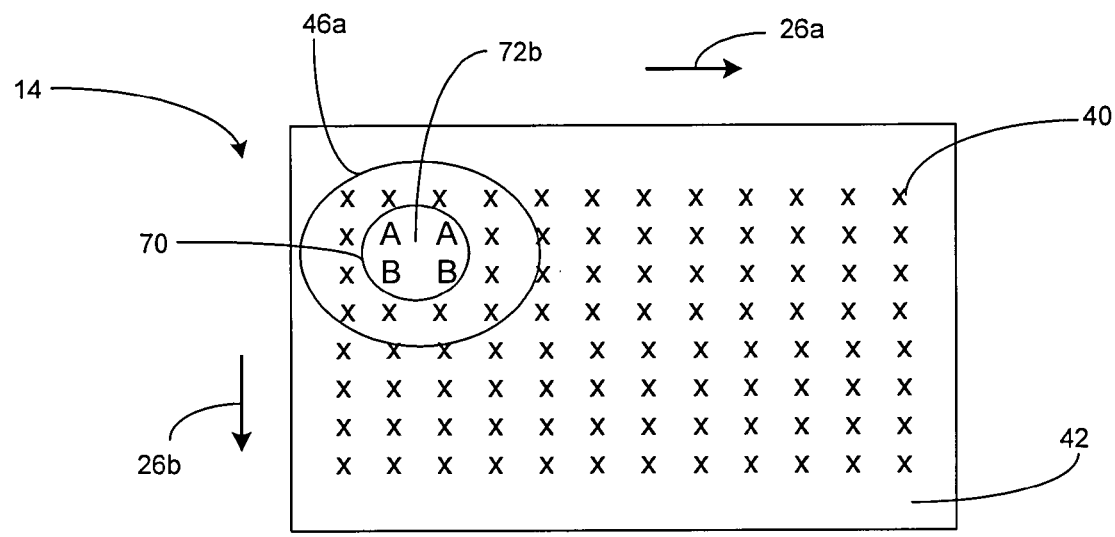

FIGS. 8A and 8B depict exemplary embodiments of an activated subarray for receiving Delta-AZ and Delta-EL signals. In this embodiment, each of the Delta components includes a 2×2 subarray (indicated by the oval 70) within the 4×4 first activated subarray 46a from FIGS. 5A and 5B. FIG. 8A depicts a Delta-AZ configuration 72a in which the two left receiving elements 40 are phase shifted 180 degrees relative to the two right receiving elements 40. FIG. 8B depicts a Delta-EL configuration 72b in which the two top receiving elements 40 elements are phase shifted 180 degrees relative to the two bottom receiving elements 40. It will be appreciated that these particular configurations represent exemplary embodiments, and other configurations may be employed.

It will be appreciated that the use of phase adjustments in the disclosed system differs from that in conventional ESA systems. As stated above, in a conventional ESA system, all transmitting/receiving elements are activated, and the phase of each element is continuously adjusted to produce an electronic scanning effect. In contrast, in the present invention the scanning effect is not achieved by phase adjustments, but rather by activating and deactivating subarrays in turn within the feed element. Furthermore, in the disclosed system, phase adjustments may be employed to correct for offset phase errors, and to configure the Sum and Delta (AZ and EL) channels to produce the beam scanning effect.

Figure 9:
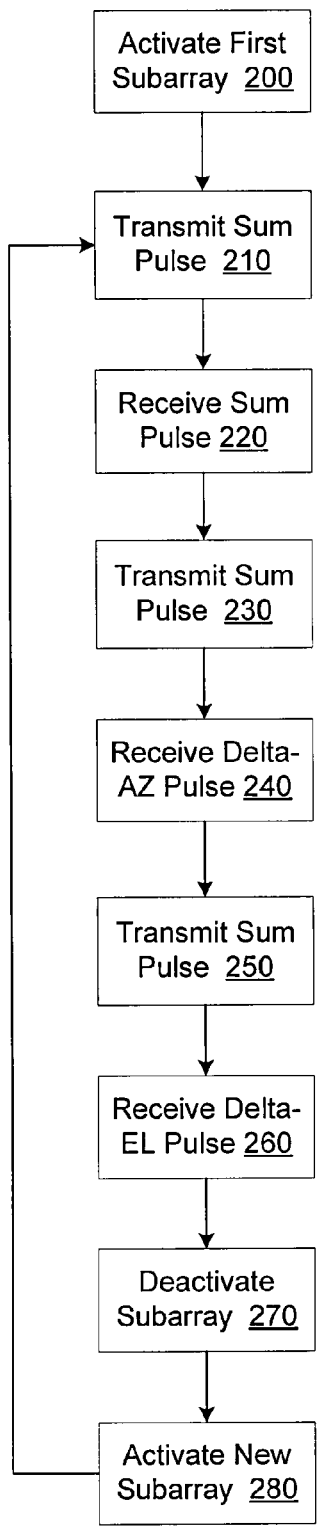
FIG. 9 is a flowchart depicting an exemplary method of tracking an object scanning within a beam scan area of an antenna system in accordance with an embodiment of the present invention.

In a preferred embodiment, the system operates as a multi-pulse antenna in which the Sum and Delta pulses or signals are separated. In particular, FIG. 9 is a flowchart depicting an exemplary method of tracking an object within a beam scan area of an antenna system in a multi-pulse mode in accordance with an embodiment of the present invention. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 200 by activating a first subarray of transmitting/receiving elements within the broader array of the feed element. The first subarray may be activated in a transmitting mode, and at step 210 the activated subarray may transmit a Sum pulse to a target region. At step 220, the activated subarray, under control of the offset beam scanner described above, may enter a receiving mode. When in the receiving mode, the activated subarray may receive a return signal bounced off an object, if any, within the target region. Specifically at step 220, the activated subarray may first be configured to receive a return Sum pulse. The activated subarray may return to transmitting mode and transmit another Sum pulse at step 230. When next entering the receiving mode at step 240, the activated subarray is configured to receive a Delta-AZ pulse, followed by the transmission of another Sum pulse at step 250. At step 260, the activated subarray is configured to receive a Delta-EL pulse. In this manner, a multi-pulse system is employed, alternating Sum pulse transmissions with the receiving of a Sum, Delta-AZ, and Delta-EL pulse in turn. Such a multi-pulse system obviates the need for additional processing electronics used in conventional monopulse systems. The disclosed system, therefore, is less costly, smaller, and lighter than conventional scanning systems, and is thus more suitable for use in smaller guided munitions.

Referring again to FIG. 9, at step 270 the activated subarray may be deactivated, and at step 280 a new subarray may be activated. As described above, the new activated subarray has at least one transmitting/receiving element not contained in the previously activated subarray. In this manner, the new subarray may transmit and receive signals associated with a target region different from that of the previously activated subarray. As shown by the arrow, the method may repeat such that varying subarrays are activated and deactivated in turn to produce the electronic scanning effect.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. An antenna system comprising:
a feed element containing an array of transmitting/receiving elements;
a reflector, having a midpoint wherein a plurality of the transmitting/receiving elements are offset from the midpoint, for reflecting signals received from the feed element to a target region, and for reflecting signals received from the target region to the feed element; and
a beam scanner which activates and deactivates in turn subarrays within the array of transmitting/receiving elements of the feed element to steer a scanned beam, and the beam scanner is configured to phase shift at least one transmitting/receiving element to correct for an offset phase error of the scanned beam.

2. The antenna system of claim 1, wherein the beam scanner activates each subarray in a transmitting mode to form a Sum channel for transmitting a Sum pulse.

3. The antenna system of claim 2, wherein the beam scanner further activates each subarray in a receiving mode to form a Sum channel for receiving a Sum pulse.

4. The antenna system of claim 3, wherein the beam scanner further activates each subarray in a receiving mode to form a Delta channel for receiving a Delta pulse.

5. The antenna system of claim 4, wherein the beam scanner forms the Delta channel as a Delta-AZ channel or a Delta-EL channel.

6. The antenna system of claim 4, wherein the Delta channel is centered within the activated subarray.

7. The antenna system of claim 2, wherein the Sum channel is a 4×4 subarray of transmitting/receiving elements.

8. The antenna system of claim 7, wherein the center four transmitting/receiving elements of the Sum channel are phase shifted 180 degrees relative to the other transmitting/receiving elements of the Sum channel.

9. The antenna system of claim 7, wherein the beam scanner further activates each subarray in a receiving mode to form a Delta channel for receiving a Delta pulse, and the Delta channel includes the center four elements of the Sum channel.

10. The antenna system of claim 1, wherein a plurality of activated subarrays is offset from a center point of the reflector.

11. A method of scanning a beam scan area of an antenna system including a reflector having a midpoint and a feed element having an array of transmitting/receiving elements, wherein a plurality of the transmitting/receiving elements are offset from the midpoint, comprising the steps of:
activating a first subarray of transmitting/receiving elements within the array of the feed element;
transmitting a signal from the first activated subarray to a target region;
entering a receiving mode, wherein the first activated subarray is configured to receive a signal from a target region;
deactivating the first activated subarray; and
activating a second subarray, wherein the second activated subarray has at least one transmitting/receiving element that is not contained within the first activated subarray; and
correcting for an offset phase error of the scanned beam by phase shifting at least one transmitting/receiving element to correct for the offset phase error.

12. The method of scanning of claim 11, further comprising repeating each step until each transmitting/receiving element in the feed element array has been activated and deactivated to steer a scanned beam.

13. A method of tracking an object within a beam scan area of an antenna system including a reflector having a midpoint and a feed element having an array of transmitting/receiving elements, wherein a plurality of the transmitting/receiving elements are offset from the midpoint, comprising the steps of:
activating a first subarray of transmitting/receiving elements within the array of the feed element;
transmitting a Sum pulse from the first activated subarray to a target region;
receiving a pulse from the target region;
deactivating the first activated subarray; and
activating a second subarray, wherein the second activated subarray has at least one transmitting/receiving element that is not contained within the first activated subarray; and
correcting for an offset phase error of the scanned beam by phase shifting at least one transmitting/receiving element to correct for the offset phase error.

14. The method tracking an object of claim 13, further comprising repeating each step until each transmitting/receiving element in the feed element array has been activated and deactivated to steer a scanned beam.

15. The method of tracking an object of claim 13, wherein the transmitting and receiving steps further comprise:
transmitting a first Sum pulse from the first activated subarray to a target region;
receiving a Sum pulse from the target region;
transmitting a second Sum pulse from the first activated subarray to a target region; and
receiving a Delta pulse from the target region.

16. The method of tracking an object of claim 15, further comprising repeating each step until each transmitting/receiving element in the feed element array has been activated and deactivated to steer a scanned beam.

17. The method of tracking an object of claim 13, wherein the transmitting and receiving steps further comprise:
transmitting a first Sum pulse from the first activated subarray to a target region;
receiving a Sum pulse from the target region;
transmitting a second Sum pulse from the first activated subarray to the target region;
receiving a Delta-AZ pulse from the target region;
transmitting a third Sum pulse from the first activated subarray to the target region; and
receiving a Delta-EL pulse from the target region.

18. The method of claim 17, wherein the Delta-AZ and Delta-EL pulses are received by transmitting/receiving elements centrally located within the activated subarray.

19. The method of tracking an object of claim 17, further comprising repeating each step until each transmitting/receiving element in the feed element array has been activated and deactivated to steer a scanned beam.

* * * * *